United States Patent
Tang et al.

(10) Patent No.: US 12,481,597 B2
(45) Date of Patent: Nov. 25, 2025

(54) MEMORY PROCESSING SYSTEM OF ENHANCED EFFICIENCY AND METHOD THEREOF

(71) Applicant: MEDIATEK INC., Hsin-Chu (TW)

(72) Inventors: En-Shou Tang, Hsinchu (TW);
Yuan-Chun Lin, Hsinchu (TW);
Kai-Hsiang Chang, Hsinchu (TW);
Yi-Che Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 105 days.

(21) Appl. No.: 18/235,365

(22) Filed: Aug. 18, 2023

(65) Prior Publication Data

US 2024/0281382 A1  Aug. 22, 2024

Related U.S. Application Data (60) Provisional application No. 63/446,309, filed on Feb. 16, 2023.

(51) Int. Cl.
*G06F 12/1009* (2016.01)
*G06F 12/1027* (2016.01)
*G06F 13/16* (2006.01)

(52) U.S. Cl.
CPC ...... *G06F 12/1009* (2013.01); *G06F 12/1027* (2013.01); *G06F 13/1689* (2013.01)

(58) Field of Classification Search
CPC ............ G06F 12/1009; G06F 12/1027; G06F 13/1689; G06F 2212/1024;
(Continued)

(56) References Cited

U.S. PATENT DOCUMENTS 8,601,223 B1 * 12/2013 Yuan ............ G06F 12/1027
711/170
2012/0297139 A1 * 11/2012 Choi ............ G06F 12/1009
711/E12.024
(Continued)

FOREIGN PATENT DOCUMENTS

| TW | 200743989 | | 12/2007 |
|---|---|---|---|
| TW | 201432570 | A | 8/2014 |
| TW | 201810046 | A | 3/2018 |

OTHER PUBLICATIONS

Xulong Tang et al., Enhancing Address Translations in Throughput Processors via Compression, Session 3: Parallel Architectures, PACT '20, Oct. 3-7, 2020, pp. 191-204, Virtual Event, USA, XP058472758, Oct. 3, 2020.
(Continued)

*Primary Examiner* — Sean D Rossiter
(74) *Attorney, Agent, or Firm* — Winston Hsu (57) ABSTRACT

A memory processing system includes a processor, a main memory, and a MMU coupled to the processor and the main memory. The processor is used to generate a plurality of virtual addresses. The main memory includes a plurality of data corresponding to physical addresses in a main page table. The main page table is used to map the plurality of virtual addresses to the plurality of physical addresses. The memory management unit includes a TLB coupled to the processor and the main memory, a table walk unit coupled to the TLB and the main memory, and a merger coupled to the TLB and the processor. The TLB performs address translation by retrieving a physical address according to a virtual address from a first page table in the TLB or a second page table in the table walk unit or the main page table in the main memory.

17 Claims, 4 Drawing Sheets

(58) Field of Classification Search
CPC ..... G06F 2212/1028; G06F 2212/1041; G06F 2212/684
See application file for complete search history.

(56) References Cited

U.S. PATENT DOCUMENTS

| | | | |
|---|---|---|---|
| 2014/0108742 A1* | 4/2014 | Boettiger | G06F 12/0862 |
| | | | 711/137 |
| 2020/0065255 A1 | 2/2020 | Lebeane | |
| 2021/0056024 A1 | 2/2021 | Levinsky | |
| 2021/0132999 A1* | 5/2021 | Haywood | G06F 9/544 |
| 2022/0342828 A1* | 10/2022 | O | G06F 12/109 |
| 2022/0391326 A1* | 12/2022 | Chisnall | G06F 16/278 |
| 2022/0414018 A1 | 12/2022 | Karve | |
| 2023/0064455 A1* | 3/2023 | Eyole | G06F 9/30043 |

OTHER PUBLICATIONS

Bharath Pichai et al., Address Translation for Throughput-Oriented Accelerators, May/Jun. 2015, pp. 102-113, IEEE Computer Society, XP011585147, May 2015.

* cited by examiner

MEMORY PROCESSING SYSTEM OF ENHANCED EFFICIENCY AND METHOD THEREOF

CROSS REFERENCE TO RELATED APPLICATIONS

This application claims the benefit of U.S. Provisional Application No. 63/446,309, filed on Feb. 16, 2023. The content of the application is incorporated herein by reference.

BACKGROUND

Memory address translation from virtual address to physical address is a process that allows a computer system to access data stored in memory. A virtual address is an abstract representation of a memory location that is independent of the actual physical address. A physical address is the actual location of a memory cell in the hardware. To translate a virtual address to a physical address, the system uses a data structure called a page table, which maps each virtual page (a fixed-size memory block) to a physical frame (a corresponding memory block in the hardware). The page table also contains information about the status and protection of each page, such as whether it is valid, present, read-only, or writable. The system divides the virtual address into two parts: a page number and an offset. The page number is used to index the page table and find the corresponding physical frame number. The offset is added to the physical frame number to obtain the final physical address. The system then accesses the data stored at that physical address.

A translation lookaside buffer (TLB) is for translating the virtual address to physical address according to the page table. The TLB usually contain a specialized cache that stores the mappings between virtual addresses and physical addresses. It is used to speed up the translation process and avoid accessing the page table for every memory access. A TLB entry includes of a tag, which is the virtual address or a part of it, and a piece of data, which is the corresponding physical address or a part of it. The TLB is usually implemented as an associative memory, which allows fast parallel lookup of multiple entries. However, this also means that the TLB has a limited size and may suffer from conflicts and misses. When a TLB miss occurs, the MMU has to consult the page table and update the TLB with the new entry. This can cause significant performance degradation if the page table is not cached or if it is too large to fit in the cache. TLB management is an important aspect of memory system design.

Table walk is usually defined as the process of walking through page tables to find the physical address corresponding to the virtual address. The table walk process starts with the virtual address. The first step is to look up the virtual address in the page table. The page table is a data structure that maps virtual addresses to physical addresses. If the page table is found according to virtual address, the page table is returned. If the page table is not found according to virtual address, a page fault occurs. A page fault is an error that occurs when the processor tries to access a memory location that is not in the page table. When a page fault occurs, usually the operating system takes over and loads the page into memory. The operating system then updates the page table to include the new physical address. The processor then retries the memory access. The table walk process can be a relatively slow process, especially if the virtual address is not found in the page table. To improve performance, many computer systems use a technique called caching. Caching involves storing recently used page table entries in a cache memory. If the virtual address is found in the cache, the physical address can be returned without having to look up the page table.

A memory transaction merge is a process of combining two or more memory transactions into a single transaction. This can be done to improve memory efficiency, reduce memory usage, or to ensure that all changes made to a data set are committed or rolled back together. However, some of the drawbacks of using memory transaction merge include complexity and computing overhead (excess or indirect computation time and memory), especially for large transactions.

Memory address translation and merge cause latency that can affect the performance of applications accessing memory frequently, such as databases, operating systems, and virtual machines. There are several techniques to reduce latency, such as caching, prefetching, and parallelism. However, these techniques also have trade-offs, such as increased power consumption, complexity, and hardware cost. It is important to design and optimize memory address translation schemes that balance the benefits and drawbacks of different approaches.

SUMMARY

An embodiment provides a memory processing system including a processor, a main memory, and a memory management unit (MMU) coupled to the processor and the main memory. The processor is used to generate a plurality of virtual addresses. Each virtual address of the plurality of virtual addresses includes a base address and an offset. The main memory includes a plurality of data corresponding to physical addresses in a main page table. Each physical address of the plurality of physical addresses includes a base address and an offset. The main page table is used to map the plurality of virtual addresses to the plurality of physical addresses. The memory management unit includes a translation lookaside buffer (TLB) coupled to the processor and the main memory, a table walk unit coupled to the translation lookaside buffer and the main memory, and a merger coupled to the translation lookaside buffer and the processor. The translation lookaside buffer is used to store a first page table mapping a first set of base addresses of virtual addresses to a first set of base addresses of physical addresses and to perform address translation. The table walk unit is used to access the main page table in the main memory, and to store a second page table mapping a second set of base addresses of virtual addresses to a second set of base addresses of physical addresses. The merger is used to merge memory transactions. The TLB performs address translation by retrieving a physical address according to a virtual address from the first page table in the TLB or the second page table in the table walk unit or the main page table in the main memory.

An embodiment provides a memory processing method implemented by a memory processing system. The memory processing system includes a processor, a main memory, and a memory management unit (MMU) coupled to the processor and the main memory. The memory management unit includes a translation lookaside buffer (TLB) coupled to the processor and the main memory, a table walk unit coupled to the TLB and the main memory, and a merger coupled to the TLB and the processor. The main memory includes a plurality of data corresponding to physical addresses in a main page table. Each physical address of the plurality of physical addresses includes a base address and an offset. The method includes generating a plurality of virtual addresses by the processor wherein each virtual address of the plurality of virtual addresses includes a base address and an offset, storing in the TLB a first page table mapping a first set of base addresses of virtual addresses to a first set of base addresses of physical addresses, accessing the main page table in the main memory, storing in the table walk unit a second page table mapping a second set of base addresses of virtual addresses to a second set of base addresses of physical addresses, merging memory transactions by the merger, and performing address translation by the TLB retrieving a physical address according to a virtual address with the first page table in the TLB, the second page table in the table walk unit or the main page table in the main memory.

Another embodiment provides a memory processing method implemented by a memory processing system. The memory processing system includes a processor, a main memory, and a memory management unit (MMU) coupled to the processor and the main memory. The memory management unit includes a translation lookaside buffer (TLB) coupled to the processor and the main memory, a table walk unit coupled to the TLB and the main memory, and a merger coupled to the TLB and the processor. The main memory includes a page table that stores the physical addresses. Each physical address of the plurality of physical addresses includes a base address and an offset. The method includes the processer generating data with a set of virtual addresses, the merger merging memory transactions;
the TLB retrieving from a first page table in the TLB according to the set of virtual addresses, if the TLB retrieving from the cache in the TLB results in a miss, the TLB retrieving the second page table in the table walk unit according to the set of virtual addresses, if the TLB retrieving from the cache in the table walk unit results in a miss, the table walk unit accessing the main page table in main memory according the set of virtual addresses, and the processor accessing data corresponding to the set of physical addresses from the main memory.

These and other objectives of the present invention will no doubt become obvious to those of ordinary skill in the art after reading the following detailed description of the preferred embodiment that is illustrated in the various figures and drawings.

DETAILED DESCRIPTION

A memory transaction merge is a process of combining two or more memory transactions into a single transaction. This can be done to improve performance and reduce memory usage. In a real-time application, memory transaction merge can reduce memory access to different frames by combining multiple transactions with the same page (or frame) into a single memory transaction.

Address translation is the process of converting a virtual address into a physical address. The virtual address is the address that is used by a program to access memory, while the physical address is the actual address of the memory location in the computer's memory. When a program accesses memory, it generates a virtual address. The virtual address is translated into a physical address by the memory management unit (MMU) using a page table. The page table is stored in memory and is used to translate virtual addresses into physical addresses. The MMU uses the page tables to translate the virtual address into a physical address by performing a hardware called translation lookaside buffer (TLB). TLB can carry out the process of walking through the page tables to find the physical address corresponding to the virtual address. The page table is organized in a tree-like structure with multiple levels. Each level of the page table contains page table entries (PTEs) that map virtual addresses to physical addresses. A table walk involves accessing multiple levels of tables, each containing entries that point to the next level or to the final physical address. The number and size of the tables depend on the architecture and configuration of the MMU. A table walk can be costly in terms of time and energy, so it is desirable to minimize the frequency and duration of table walks by using efficient caching and prefetching techniques.

The above-mentioned two processes, i.e., memory transaction merge and address translation in MMU, can be done simultaneously to enhance efficiency in memory processing. The system and method of such memory processing with enhanced efficiency are described in this disclosure.

Figure 1:
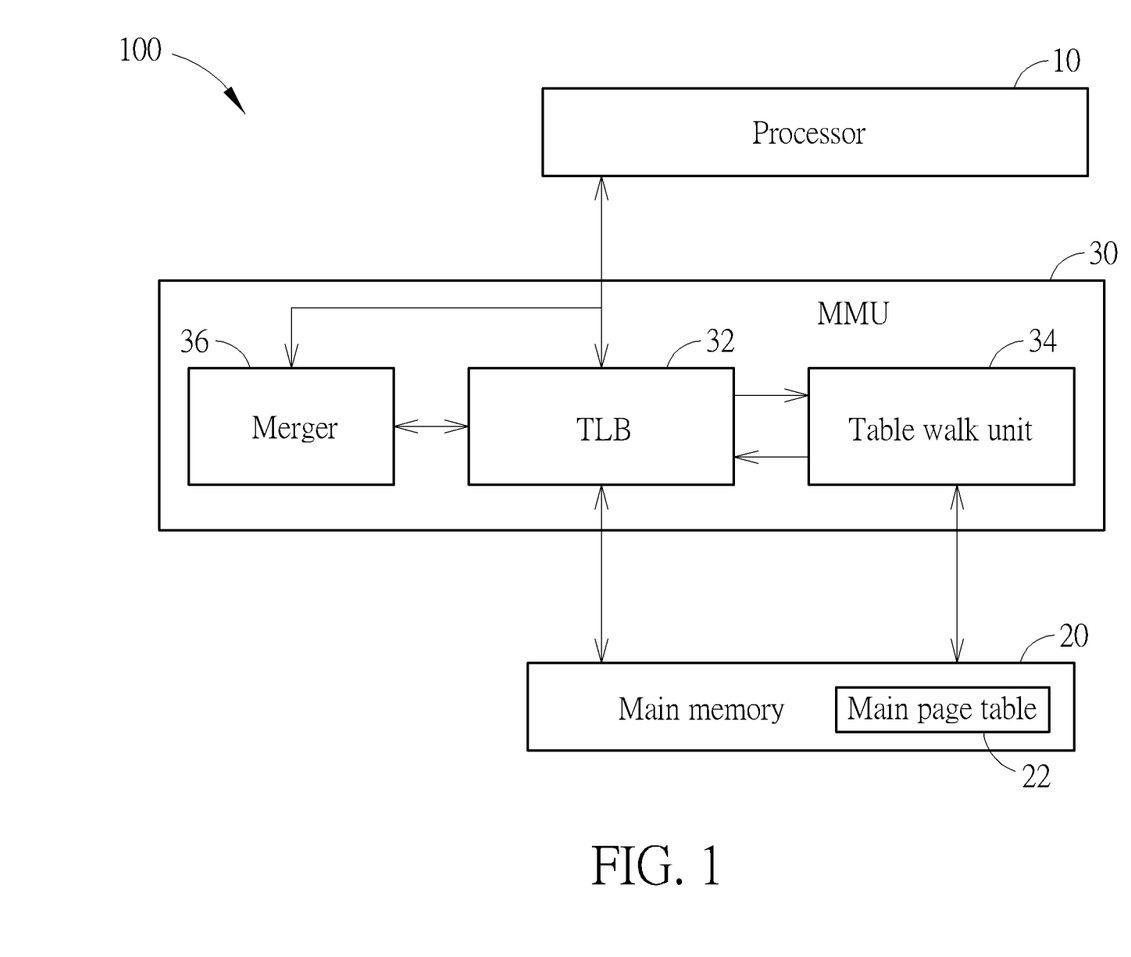
FIG. 1 illustrates a memory processing system of an embodiment.

FIG. 1 illustrates a memory processing system 100 of an embodiment. The memory processing system 100 includes a processor 10, a main memory 20, and a memory management unit (MMU) 30 coupled to the processor 10 and the main memory 20. The processor 10 is used to generate a plurality of virtual addresses. Each virtual address of the plurality of virtual addresses includes a base address and an offset. The main memory 20 includes data corresponding to physical addresses in a main page table 22 that stores physical addresses. Each physical address of the plurality of physical addresses includes a base address and an offset. The main page table 22 is used to map the plurality of virtual addresses to the plurality of physical addresses. The memory management unit 30 includes a translation lookaside buffer (TLB) 32 coupled to the processor 10 and the main memory 20, a table walk unit 34 coupled to the TLB 32 and the main memory 20, and a merger 36 coupled to the TLB 32 and the processor 10. The TLB 32 is used to store a first page table mapping a first set of base addresses of virtual addresses to a first set of base addresses of physical addresses and to perform address translation. The table walk unit 34 is used to access a main page table 22 in the main memory 20, and to store a second page table mapping a second set of base addresses of virtual addresses to a second set of base addresses. The merger 36 is used to merge memory transactions. The TLB 32 performs address translation by retrieving a physical address according to a virtual address in the first page table in the TLB 32, the second page table in the table walk unit 34 or the main page table 22 in the main memory 20.

It should be noted that the term memory transaction in the context of this disclosure means read-write operations of data to memory locations. A read transaction occurs when the processor 10 requests data from the main memory 20, and a write transaction occurs when the processor 10 sends data to the main memory 20.

In some embodiments, there may be multiple page tables stored in the MMU 30 or the main memory 20, and the TLB 32 may access each one of these page tables. A person having ordinary skill in the art can easily modify the embodiment according to this disclosure.

The processor 10 can be any type of general purpose processor or application specific processor, including but not limited to digital signal processor (DSP), graphics processing unit (GPU), application-specific integrated circuit (ASIC), and field-programmable gate array (FPGA) and central processing unit (CPU). The main memory 20 can include any type of data-storing device, such as random access memory (RAM), flash memory, and hard-drive. The table walk unit 34 can be implemented by caches for storing page table entries.

A virtual address is a logical address used by a process or thread in an operating system (OS) to access the main memory 20. Virtual addresses are not the same as physical addresses, but rather they are translated by the TLB 32 into physical addresses before being used to access the main memory 20. A virtual address has of two parts: a base address (or page number) and an offset. The base address, also called page number, is an index into the main page table 22. The main page table 22 is a data structure that maps virtual addresses to physical addresses. The offset is the byte offset within the page. The offset is used to access the specific byte of data within the page.

On the other hand, a physical address is a unique address that identifies a specific location in a physical memory. Physical addresses are used by the hardware to access physical memory directly. Physical addresses are typically represented as a sequence of binary digits, or bits. The number of bits used to represent a physical address depends on the size of the computer's memory. For example, a computer with 4GB of memory would use 32 bits to represent each physical address. Physical addresses are also divided into two parts: a base address (or frame number) and an offset. The base address, also called frame number, identifies the specific frame of memory that contains the data. The offset identifies the specific byte of data within the frame. For example, a 32-bit physical address may have 20 bits for the frame number and 12 bits for the offset.

To convert a virtual address to a physical address, address translation is required because virtual addresses are typically larger in size than physical addresses. This is because virtual addresses can be used to access memory that is not currently in physical memory.

The TLB 32 is a memory cache that stores recently used translations of virtual addresses to physical addresses. It can be used to reduce the time taken to access a user memory location. It can be part of memory-management unit (MMU) 30. The TLB 32 may reside between the processor 10 and the main memory 20. It some embodiments, it may reside between the different levels of a multi-level cache.

In some embodiments, the TLB 32 can be a piece of hardware for translating a virtual address to a physical address by using page tables stored in the MMU 30 or the main memory 20. In some embodiments, it can be implemented as a fast lookup hardware cache with data processing capability. The TLB 32 can include a fixed number of slots of page table entries. The page table entries map virtual addresses to physical addresses. Each entry in the TLB 32 has of two parts: a page number and a frame number. If the page number of the incoming virtual address matches the page number in the TLB 32, the corresponding frame number is returned. Then, the frame number with offset is the physical address stored in the main page table 22. Since the TLB lookup is usually a part of the instruction pipeline, searches are fast and cause essentially no performance penalty. However, in order to be able to search within the instruction pipeline, the TLB 32 usually has to be small in size.

When there is a TLB miss, meaning that the requested address is not cached in the TLB 32, the table walk unit 34 begins to look up the virtual address in the page table entries in the table walk unit 34. If the virtual address is found, a page table is returned. If the virtual address is not found in the table walk unit 34, then the table walk unit 34 would access the main page table 22 in the main memory 20. The main page table 22 in the main memory 20 is a larger, slower memory that stores all of the translations for a process's virtual address space. Accessing the main page table 22 in the main memory 20 generally takes a lot more time than accessing the TLB 32 and the table walk unit 34.

While the above-described address translation is being performed, the memory transaction merge can also be performed by the merger 36 at substantially the same time (i.e., the same clock cycles) by implementing specific instructions. By perform memory transaction merge and table walk process in parallel (i.e., at substantially the same clock cycles), the two processes can hid each other's latency, thus improving the overall performance.

Figure 2:
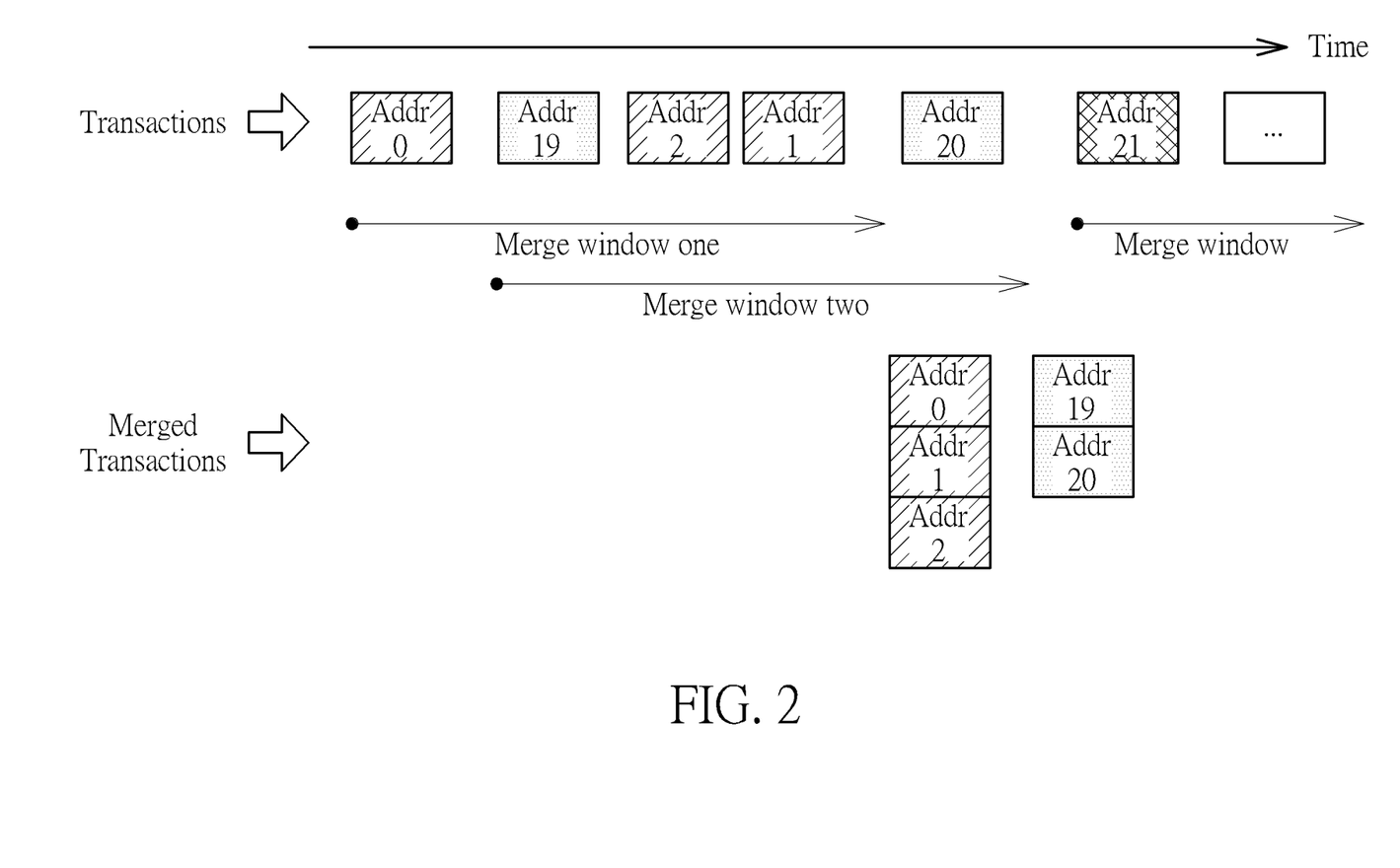
FIG. 2 illustrates memory transaction merge performed by the merger of FIG. 1.

FIG. 2 illustrates memory transaction merge performed by the merger 36. Memory transaction merge is a process of combining two or more memory transactions into a single transaction. In this embodiment, multiple memory transactions having the same base address and consecutive offsets within a merge window can be merged into a single memory transaction. The merger 36 is a piece of hardware implemented to perform such task.

In an example, within merge window one, three separate memory transactions (i.e., address 0, address 2 and address 1) have an identical base address (i.e., the same page number) and consecutive offsets, the merger 36 can merge these three memory transactions (i.e., address 0, address 2 and address 1) into a single memory transaction with consecutive offsets.

In another example, within merge window two, two separate memory transactions (i.e., address 19 and address 20) have an identical base address (i.e., the same page number) and consecutive offsets, the merger 36 can merge these two memory transactions (i.e., address 19 and address 20) into a single memory transaction with consecutive offsets.

In some embodiments, the merge window for write access is greater than or equal to 64 clock cycles. In some embodiments, the merge window for read access is greater than or equal to 8 clock cycles.

Furthermore, the merger 36 can discard a memory transaction if a data corruption occurs in the main memory 20 or an error occurs in the MMU 30 related to the memory transaction. Some examples of data corruptions include bit flip, memory leaks, buffer overflows, etc. Some examples of errors occurring in the MMU 30 include invalid page, page table corruption, TLB shootdown, etc.

In more detail, a bit flip happens when a single bit of data changes from 0 to 1 or vice versa, due to electromagnetic interference, or faulty hardware. Bit flips can cause data to become unreadable, invalid, or inconsistent. On the other hand, a memory leak happens when a program fails to release the memory it has allocated after it is no longer needed, causing the memory to be wasted and unavailable for other programs. Memory leaks can degrade the performance of the system and eventually lead to crashes or hangs. Moreover, a buffer overflow happens when a program writes more data to a memory location than it can hold, causing the excess data to overwrite adjacent memory locations. Buffer overflows can corrupt data, cause unexpected behavior, or allow attackers to execute malicious code.

In some circumstances, invalid page happens when a process tries to access a virtual address that is not mapped to any physical address or that is not allowed by the access permissions. In other circumstances, page table corruption happens when the page table is corrupted by a hardware failure, a software bug, or a malicious attack. Moreover, TLB shootdown happens when multiple processors share the same physical memory and have different TLBs; when one processor updates a page table entry, it has to invalidate the corresponding TLB entries on other processors, which may cause synchronization overhead.

The above illustrations are merely example. There may be various methods of memory transaction merge with certain modifications and alterations and the invention is not limited thereto. Combining multiple memory transactions into a single transaction can reduce the frequency of accessing different frames in the main memory 20, thus enhancing efficiency.

Figure 3:
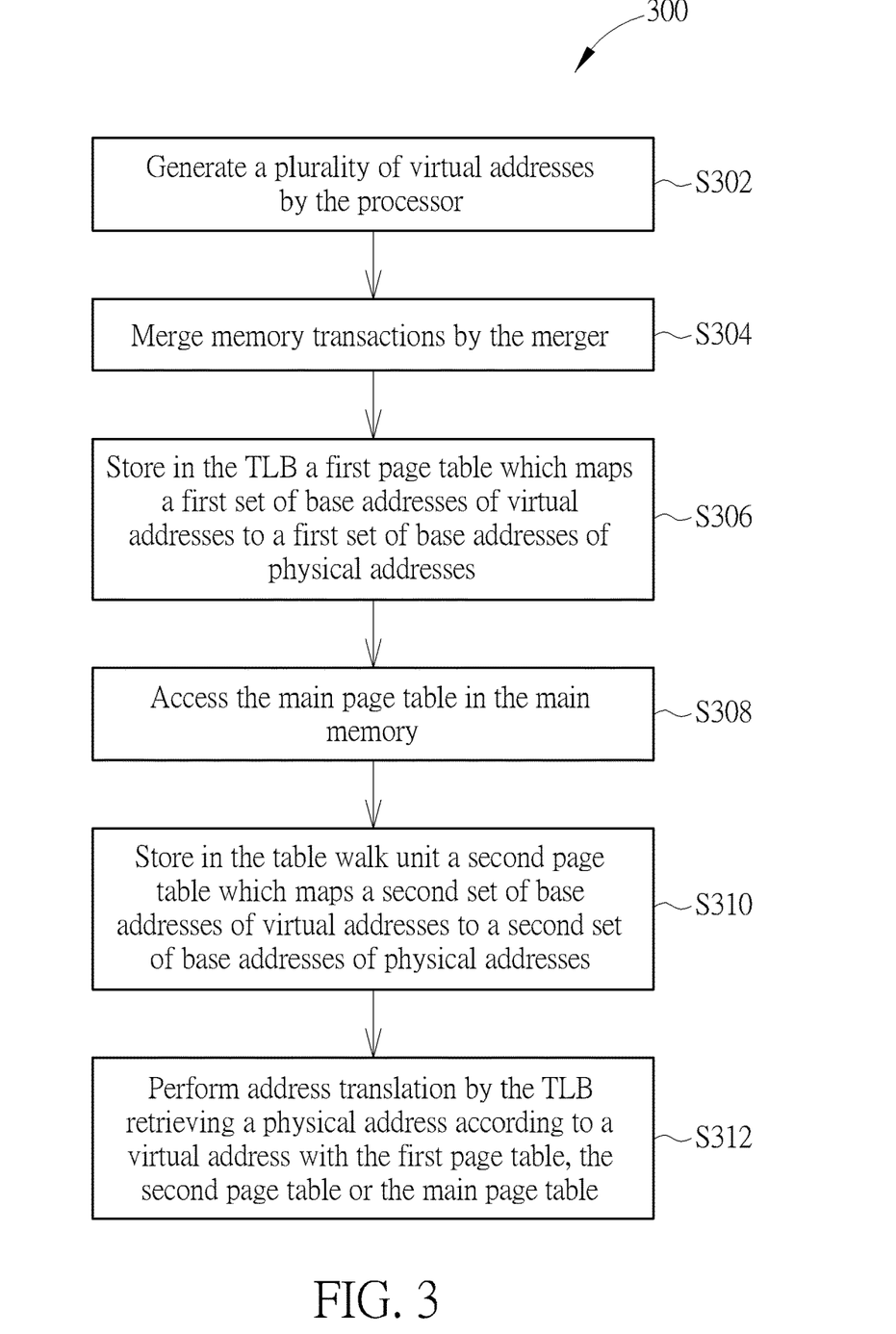
FIG. 3 illustrates a flowchart of a memory processing method of an embodiment implemented by the memory processing system of FIG. 1.

FIG. 3 is a flowchart of a memory processing method 300 of an embodiment implemented by the memory processing system 100. The memory processing method 300 includes the following steps:

S302: Generate a plurality of virtual addresses by the processor 10;
S304: Merge memory transactions by the merger 36;
S306: Store in the TLB 32 a first page table which maps a first set of base addresses of virtual addresses to a first set of base addresses of physical addresses;
S308: Access the main page table 22 in the main memory 20;
S310: Store in the table walk unit 34 a second page table which maps a second set of base addresses of virtual addresses to a second set of base addresses of physical addresses; and
S312: Perform address translation by the TLB 32 retrieving a physical address according to a virtual address with the first page table in the TLB 32, the second page table in the table walk unit 34 or the main page table 22 in the main memory 20.

The memory processing method 300 summarizes the description in the above paragraphs. Thus, the details are not repeated herein.

During the processing time of the MMU 30, the merger 36 can perform transaction merge simultaneously. That is, step S304 can be performed in parallel with steps S306-S312. The address translation, and the memory transaction merge can hide each other's latency, therefore improving the overall memory processing efficiency.

Figure 4:
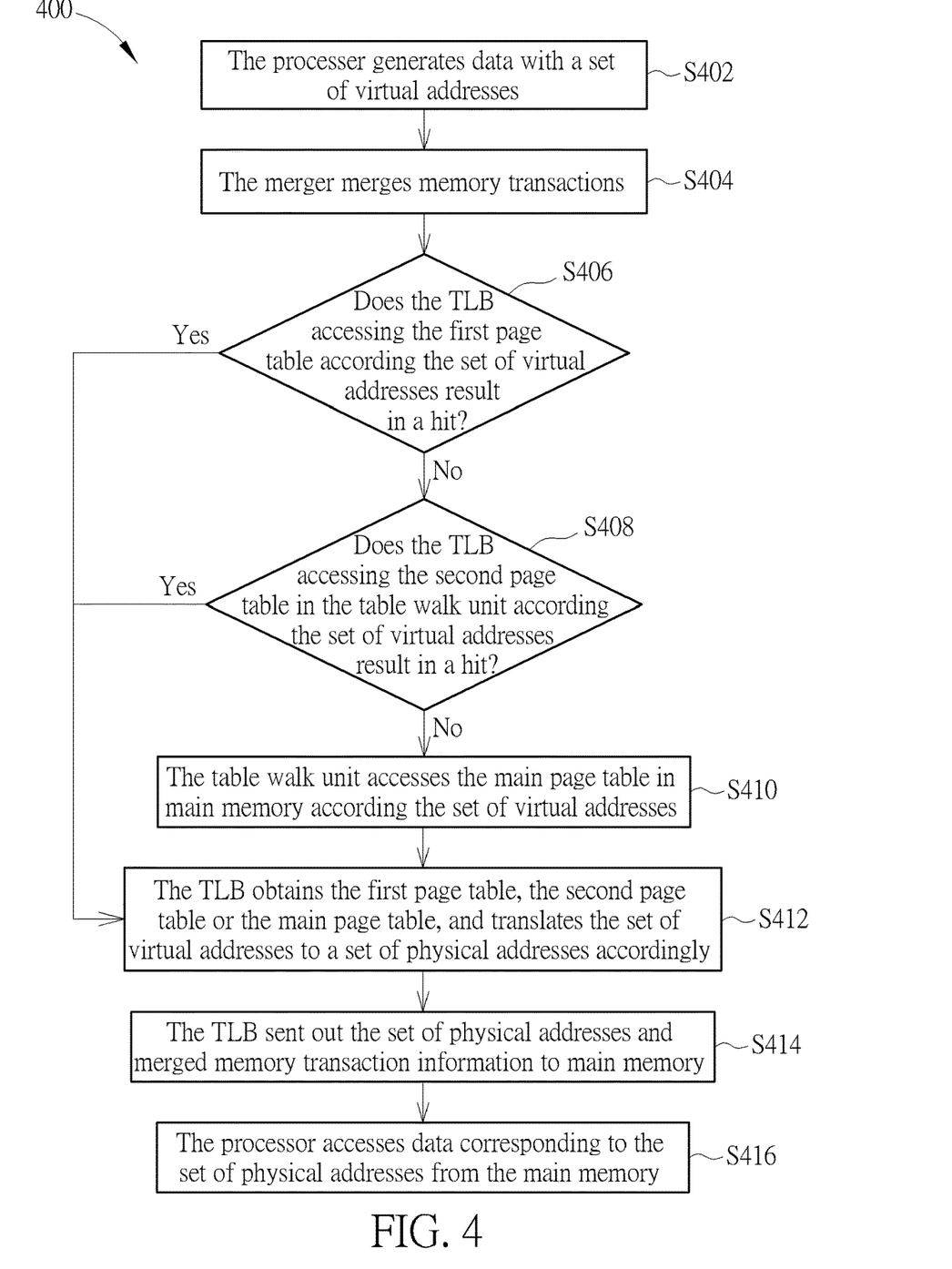
FIG. 4 illustrates a flowchart of a memory processing method of another embodiment implemented by the memory processing system of FIG. 1.

FIG. 4 is a flowchart of a memory processing method 400 of another embodiment implemented by the memory processing system 100. The memory processing method 400 includes the following steps:

S402: The processor 10 generates data with a set of virtual addresses;
S404: The merger 32 merges memory transactions;
S406: The TLB 32 accesses the first page table according the set of virtual addresses; if hit, proceed to S412; if miss, proceed to S408;
S408: The TLB 32 accesses the second page table in the table walk unit 34 according the set of virtual addresses; if hit, proceed to S412; if miss, proceed to S410;
S410: The table walk unit 34 accesses the main page table 22 in main memory 20 according the set of virtual addresses;
S412: The TLB 32 obtains the first page table, the second page table or the main page table 22, and translates the set of virtual addresses to a set of physical addresses accordingly;
S414: The TLB 32 sents out the set of physical addresses and merged memory transaction information to main memory 20; and
S416: The processor 10 accesses data corresponding to the set of physical addresses from the main memory 20.

The memory processing method 400 summarizes the description in the above paragraphs. The details are not repeated herein.

In step S412, the data is access after the TLB 32, table walk unit 34 and merger 36 all finished the current transaction process. Also, the set of physical addresses can include one or more physical addresses.

Step S404 can be performed in parallel with steps S406-S412. Thus, the address translation and the memory transaction merge can hide each other's latency, therefore improving the overall memory processing efficiency.

The memory processing method and system described above may be implemented by one or more computers. In further detail, software and hardware hybrid implementations of some of the embodiments disclosed may be implemented on a programmable network resident device (which should be understood to include intermittently connected network-aware device) selectively activated or reconfigured by a computer program stored in memory. Such network devices may have multiple network interfaces that may be configured or designed to utilize different types of network communication protocols. A general architecture for some of these devices may be disclosed herein in order to illustrate one or more examples by which a given unit of functionality may be implemented. In some embodiments, at least some of the features or functionalities disclosed herein may be implemented on one or more general-purpose computers associated with one or more networks, such as an end-user computer system, a client computer, a network server or other server system, a mobile computing device (e.g., tablet computing device, mobile phone, smartphone, laptop, and the like), a consumer electronic device or any other suitable electronic device, or any combination thereof. In some embodiments, at least some of the features or functionalities of the various embodiments disclosed may be implemented in one or more virtualized computing environments (e.g., network computing clouds, virtual machines hosted on one or more physical computing machines, or the like).

In some embodiments, the computing instructions may be carried out by an operating system, for example, Microsoft Windows™, Apple Mac OS/X or iOS operating systems, some variety of the Linux operating system, Google Android™ operating system, or the like.

In some embodiments, the computers may be on a distributed computing network, such as one having any number of clients and/or servers. Each client may run software for implementing client-side portions of the embodiments. In addition, any number of servers may be provided for handling requests received from one or more clients. Clients and servers may communicate with one another via one or more electronic networks, which may be in various embodiments such as the Internet, a wide area network, a mobile telephone network, a wireless network (e.g., Wi-Fi, 5G, and so forth), or a local area network. Networks may be implemented using any known network protocols.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory processing system comprising:
a processor configured to generate a plurality of virtual addresses, each virtual address of the plurality of virtual addresses comprising a base address and an offset;
a main memory comprising:
a plurality of data corresponding to a plurality of physical addresses, each physical address of the plurality of physical addresses comprising a base address and an offset; and
a main page table configured to map the plurality of virtual addresses to the plurality of physical addresses;
a memory management unit (MMU) coupled to the processor and the main memory, comprising:
a translation lookaside buffer (TLB) coupled to the processor and the main memory, configured to store a first page table mapping a first set of base addresses of virtual addresses to a first set of base addresses of physical addresses, and to perform address translation;
a table walk unit coupled to the translation lookaside buffer and the main memory, configured to access the plurality of physical addresses in the main memory, and to store a second page table mapping a second set of base addresses of virtual addresses to a second set of base addresses of physical addresses;

a merger coupled to the translation lookaside buffer and the processor, configured to merge memory transactions;

wherein the TLB performs address translation by retrieving a physical address according to a virtual address from the first page table in the TLB, the second page table in the table walk unit or the main page table in the main memory; and the merger merges a plurality of memory transactions having consecutive offsets with an identical base address within a merge window into a single memory transaction.

2. The memory processing system of claim 1, wherein if the TLB accesses a base address of the virtual address from the first page table in the TLB results in a miss, the TLB accesses the base address of the virtual address from the second page table in the table walk unit.

3. The memory processing system of claim 2, wherein if the TLB accesses the base address of the virtual address from the second page table in the table walk unit results in a miss, the table walk unit accesses the base address of the virtual address from the main page table in the main memory.

4. The memory processing system of claim 1, wherein if the merge window is for write access, the merge window is greater than or equal to 64 clock cycles.

5. The memory processing system of claim 1, wherein if the merge window is for read access, the merge window is greater than or equal to 8 clock cycles.

6. The memory processing system of claim 1, wherein the merger discards a memory transaction if a data corruption occurs in the main memory or an error occurs in the memory management unit related to the memory transaction.

7. The memory processing system of claim 1, wherein the base address of the virtual address is a page number.

8. The memory processing system of claim 1, wherein the base address of the physical address is a frame number.

9. A memory processing method implemented by a memory processing system, the memory processing system comprising a processor, a main memory, and a memory management unit (MMU) coupled to the processor and the main memory, the memory management unit comprising a translation lookaside buffer (TLB) coupled to the processor and the main memory, a table walk unit coupled to the TLB and the main memory, and a merger coupled to the TLB and the processor, the main memory comprising a plurality of data corresponding to a plurality of physical addresses and a main page table, each physical address of the plurality of physical addresses comprising a base address and an offset, the main page table comprising the plurality of physical addresses, the method comprising:

generating a plurality of virtual addresses by the processor, each virtual address of the plurality of virtual addresses comprising a base address and an offset;

merging a plurality of memory transactions having consecutive offsets with an identical base address within a merge window into a single memory transaction by the merger;

storing in the TLB a first page table mapping a first set of base addresses of virtual addresses to a first set of base addresses of physical addresses;

accessing the main page table in the main memory;

storing in the table walk unit a second page table mapping a second set of base addresses of virtual addresses to a second set of base addresses of physical addresses; and performing address translation by retrieving a physical address according to a virtual address from the first page table in the TLB or the second page table in the table walk unit, or the main page table in the main memory.

10. The memory processing method of claim 9, wherein performing address translation comprises if accessing a base address of the virtual address from the first page table in the TLB results in a miss, the TLB accesses the base address of the virtual address from the second page table in the table walk unit.

11. The memory processing method of claim 10, wherein performing address translation further comprises if accessing the base address of the virtual address from the second page table in the table walk unit results in a miss, the table walk unit accesses the base address of the virtual address from the main page table in the main memory.

12. A memory processing method implemented by a memory processing system, the memory processing system comprising a processor, a main memory, and a memory management unit (MMU) coupled to the processor and the main memory, the memory management unit comprising a translation lookaside buffer (TLB) coupled to the processor and the main memory, a table walk unit coupled to the TLB and the main memory, and a merger coupled to the TLB and the processor, the main memory comprising a plurality of data corresponding to a plurality of physical addresses and a main page table, each physical address of the plurality of physical addresses comprising a base address and an offset, the main page table comprising the plurality of physical addresses, the method comprising:

the processor generating data with a set of virtual addresses;

the merger merging a plurality of memory transactions having consecutive offsets with an identical base address within a merge window into a single memory transaction;

the TLB accessing a first page table in the TLB according to the set of virtual addresses;

if the TLB accessing the first page table results in a miss, the TLB accessing the second page table in the table walk unit according to the set of virtual addresses;

if the TLB accessing the second page table results in a miss, the table walk unit accessing the main page table in main memory according to the set of virtual addresses; and the processor accessing data corresponding to the set of physical addresses from the main memory.

13. The memory processing method of claim 12, wherein:

if the merge window is for write access, the merge window is greater than or equal to 64 clock cycles; and if the merge window is for read access, the merge window is greater than or equal to 8 clock cycles.

14. The memory processing method of claim 12, further comprising the merger discarding a memory transaction if a data corruption occurs in the main memory or an error occurs in the memory management unit related to the memory transaction.

15. The memory processing system of claim 1, wherein the merger merges the memory transactions and the TLB performs address translation in parallel.

16. The method of claim 9, wherein merging the memory transactions and performing address translation occur in parallel.

17. The method of claim 12, wherein merging the memory transactions by the merger and one of following processes occurs in parallel:

the TLB retrieving from a cache in the TLB;
the TLB retrieving from a cache in the table walk unit; and
the table walk unit accessing the main memory.

\* \* \* \* \*